US012687627B2

(12) United States Patent
Ali

(10) Patent No.: US 12,687,627 B2
(45) Date of Patent: Jul. 21, 2026

(54) SYSTEM AND METHOD FOR VEHICLE OCCUPANCY DETECTION

(71) Applicant: GM Global Technology Operations LLC, Detroit, MI (US)

(72) Inventor: Kamran Ali, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 18/522,436

(22) Filed: Nov. 29, 2023

(65) Prior Publication Data

US 2025/0172683 A1 May 29, 2025

(51) Int. Cl.
*G01S 13/56* (2006.01)
*G01S 13/00* (2006.01)

(52) U.S. Cl.
CPC ............ *G01S 13/56* (2013.01); *G01S 13/003* (2013.01)

(58) Field of Classification Search
CPC ...... G01S 13/56; G01S 13/003; G01S 13/878; G01S 7/415; G01S 7/003; B60R 21/01512; B60R 21/01516; B60R 21/0153; H04W 4/02; H04W 4/80; H04W 24/08; H04W 64/006; H04B 17/336
See application file for complete search history.

(56) References Cited

U.S. PATENT DOCUMENTS

| | | | |
|---|---|---|---|
| 5,602,734 | A | 2/1997 | Kithil |
| 7,106,203 | B2 | 9/2006 | Edwards et al. |

| | | | |
|---|---|---|---|
| 2002/0136176 | A1 | 9/2002 | Abeta et al. |
| 2002/0140215 | A1 | 10/2002 | Breed et al. |
| 2004/0119599 | A1 | 6/2004 | Stevenson et al. |
| 2004/0130442 | A1 | 7/2004 | Breed et al. |
| 2007/0221428 | A1 | 9/2007 | Strutz et al. |
| 2008/0077546 | A1 | 3/2008 | Hofbeck et al. |
| 2009/0017838 | A1 | 1/2009 | Laroia et al. |
| 2013/0314223 | A1 | 11/2013 | Masudaya et al. |
| 2014/0057580 | A1 | 2/2014 | Rofougaran et al. |
| 2016/0111878 | A1 | 4/2016 | Qureshi et al. |
| 2018/0259638 | A1* | 9/2018 | Campbell ............. A61B 5/1113 |
| 2019/0097865 | A1 | 3/2019 | Xu et al. |
| 2019/0176837 | A1 | 6/2019 | Williams et al. |

(Continued)

FOREIGN PATENT DOCUMENTS

| | | |
|---|---|---|
| DE | 10144877 A1 | 4/2003 |
| DE | 10341578 A1 | 4/2005 |

(Continued)

OTHER PUBLICATIONS

Ali, K., et al. U.S. Appl. No. 18/469,086, filed Sep. 18, 2023.

(Continued)

*Primary Examiner* — Siu M Lee

(74) *Attorney, Agent, or Firm* — Vivacqua Crane, PLLC

(57) ABSTRACT

A system for detecting one or more occupants in a vehicle may include a plurality of wireless modules and a controller in electrical communication with the plurality of wireless modules. The controller is programmed to perform one or more sensing rounds. Each of the one or more sensing rounds includes communication between at least two of the plurality of wireless modules. The controller is programmed to determine a presence of the one or more occupants in the vehicle based at least in part on the one or more sensing rounds.

17 Claims, 7 Drawing Sheets

(56)　　　　　References Cited

U.S. PATENT DOCUMENTS

| | | | |
|---|---|---|---|
| 2020/0169275 A1 | 5/2020 | Chahal et al. | |
| 2020/0172049 A1 | 6/2020 | Scheele et al. | |
| 2021/0086778 A1 | 3/2021 | Suthar et al. | |
| 2021/0225152 A1* | 7/2021 | Taylor | G08B 21/22 |
| 2021/0245763 A1* | 8/2021 | Gomez | G01S 7/2883 |
| 2021/0291823 A1 | 9/2021 | Newman et al. | |
| 2022/0075051 A1* | 3/2022 | Woo | G01S 7/415 |
| 2022/0188624 A1 | 6/2022 | Kuehnle et al. | |
| 2022/0388525 A1* | 12/2022 | Roberts | B60W 50/14 |
| 2023/0039726 A1 | 2/2023 | Ricart et al. | |
| 2023/0091178 A1* | 3/2023 | Murata | B60N 2/003 |
| | | | 342/27 |
| 2023/0168364 A1* | 6/2023 | Podkamien | G01S 13/582 |
| | | | 701/45 |
| 2023/0184917 A1* | 6/2023 | Kim | B60N 2/002 |
| 2023/0262750 A1 | 8/2023 | Krajnc et al. | |
| 2023/0294705 A1* | 9/2023 | Ali | B60W 40/08 |
| | | | 701/1 |
| 2023/0299829 A1* | 9/2023 | Ali | B60W 40/08 |
| | | | 370/252 |
| 2023/0341535 A1* | 10/2023 | Zhang | G06V 20/597 |
| 2023/0382340 A1* | 11/2023 | Elad | G01S 13/42 |
| 2024/0175982 A1* | 5/2024 | Cong | G01S 13/56 |
| 2024/0414288 A1 | 12/2024 | Ali | |
| 2024/0418852 A1* | 12/2024 | Gehlawat | G01S 13/88 |
| 2025/0076461 A1* | 3/2025 | Choi | G08B 29/18 |

FOREIGN PATENT DOCUMENTS

| | | | | |
|---|---|---|---|---|
| DE | 102007055091 A1 | 5/2009 | | |
| WO | WO-2024041791 A1 * | 2/2024 | | G06V 20/593 |

OTHER PUBLICATIONS

United States Patent and Trademark Office. U.S. Appl. No. 18/469,086, filed Sep. 18, 2023.

Xie, Y., et al. "Precise Power Delay Profiling with Commodity WiFi," MobiCom '15: Proceedings of the 21st Annual International Conference on Mobile Computing and Networking, Sep. 2015, pp. 53-64.

* cited by examiner

SYSTEM AND METHOD FOR VEHICLE OCCUPANCY DETECTION

INTRODUCTION

The present disclosure relates to a system and method for occupant detection for a vehicle.

Vehicle occupancy detection systems are used to detect a presence of occupants within a vehicle. In some examples, vehicle occupancy detection systems may be used to adjust airbag deployment procedures. For example, the vehicle occupancy detection system may be used to prevent deployment of an airbag for an unoccupied seat. In another example, the vehicle occupant detection system may be used to adjust one or more airbag deployment parameters based on characteristics of an occupant (e.g., weight). In yet another example, vehicle occupancy detection systems may be used to notify vehicle operators about occupants which are left behind in the vehicle (e.g., children). In some embodiments, vehicle occupancy detection systems utilize weight and/or pressure sensors incorporated into one or more seats of the vehicle to detect occupants. However, weight and/or pressure sensors may be unreliable for detection of occupants having a relatively low weight, such as, for example, children and infants. Furthermore, weight and/or pressure sensors may not be able to distinguish between occupants and other sources of weight and/or pressure, such as, for example, cargo placed on a seat of the vehicle.

Thus, while current vehicle occupancy detection systems systems achieve their intended purpose, there is a need for a new and improved system and method for detecting one or more occupants in a vehicle.

SUMMARY

According to several aspects, a system for detecting one or more occupants in a vehicle is provided. The system may include a plurality of wireless modules and a controller in electrical communication with the plurality of wireless modules. The controller is programmed to perform one or more sensing rounds. Each of the one or more sensing rounds includes communication between at least two of the plurality of wireless modules. The controller is programmed to determine a presence of the one or more occupants in the vehicle based at least in part on the one or more sensing rounds.

In another aspect of the present disclosure, to perform the one or more sensing rounds, the controller is further programmed to determine a plurality of participating wireless modules. The plurality of participating wireless modules is a subset of the plurality of wireless modules. The plurality of participating wireless modules includes at least two of the plurality of wireless modules. To perform the one or more sensing rounds, the controller is further programmed to transmit one or more signals between at least two of the plurality of participating wireless modules. To perform the one or more sensing rounds, the controller is further programmed to determine a plurality of channel state information (CSI) values based at least in part on the one or more signals.

In another aspect of the present disclosure, to determine the plurality of participating wireless modules, the controller is further programmed to determine a predicted location of the one or more occupants within a passenger compartment of the vehicle. To determine the plurality of participating wireless modules, the controller is further programmed to determine the plurality of participating wireless modules based at least in part on the predicted location of the one or more occupants within the passenger compartment of the vehicle.

In another aspect of the present disclosure, the system further includes one or more vehicle sensors in electrical communication with the controller. To determine the predicted location of the one or more occupants within the passenger compartment of the vehicle, the controller is further programmed to perform one or more measurements using the one or more vehicle sensors. To determine the predicted location of the one or more occupants within the passenger compartment of the vehicle, the controller is further programmed to determine the predicted location of the one or more occupants within the passenger compartment of the vehicle based at least in part on the one or more measurements.

In another aspect of the present disclosure, to transmit the one or more signals between at least two of the plurality of participating wireless modules, the controller is further programmed to transmit the one or more signals between each combination of two of the plurality of participating wireless modules.

In another aspect of the present disclosure, to transmit the one or more signals between at least two of the plurality of participating wireless modules, the controller is further programmed to vary a frequency band of the one or more signals between at least two of the one or more sensing rounds.

In another aspect of the present disclosure, to determine the presence of the one or more occupants in the vehicle, the controller is further programmed to perform an inverse Fourier transform on the plurality of CSI values to determine a time-domain power delay profile. To determine the presence of the one or more occupants in the vehicle, the controller is further programmed to identify a motion marker based at least in part on the time-domain power delay profile. To determine the presence of the one or more occupants in the vehicle, the controller is further programmed to determine a presence of the one or more occupants in the vehicle based at least in part on the motion marker.

In another aspect of the present disclosure, one or more of the plurality of wireless modules is at least one of: a digital wireless local area network (WLAN) transceiver system configured to implement a wireless communication protocol and a signal conversion device configured to convert signals between at least two frequency bands.

In another aspect of the present disclosure, one or more of the plurality of wireless modules are located within a passenger compartment of the vehicle. A location of each of the plurality of wireless modules is determined based at least in part on an estimated sensing signal-to-noise ratio (SSNR) at one or more target locations within the passenger compartment of the vehicle.

In another aspect of the present disclosure, The system of claim 9. The SSNR at a target location within the passenger compartment of the vehicle is defined by:

$$SSNR_T \propto \frac{\gamma_{12}}{(\gamma_{1T}\gamma_{2T})^2}$$

where $SSNR_T$ is the SSNR at the target location within the passenger compartment of the vehicle, $\gamma_{12}$ is a distance between a first of the plurality of wireless modules and a second of the plurality of wireless modules, $\gamma_{1T}$ is a distance between the first of the plurality of wireless modules and the target location, and $\gamma_{2T}$ is a distance between the second of the plurality of wireless modules and the target location.

According to several aspects, a method for detecting one or more occupants in a vehicle is provided. The method may include performing one or more sensing rounds. Each of the one or more sensing rounds includes communication between at least two of a plurality of wireless modules. The method further may include determining a presence of the one or more occupants in the vehicle based at least in part on the one or more sensing rounds.

In another aspect of the present disclosure, performing the one or more sensing rounds further may include determining a plurality of participating wireless modules. The plurality of participating wireless modules is a subset of the plurality of wireless modules. The plurality of participating wireless modules includes at least two of the plurality of wireless modules. Performing the one or more sensing rounds further may include transmitting one or more signals between at least two of the plurality of participating wireless modules. Performing the one or more sensing rounds further may include determining a plurality of channel state information (CSI) values based at least in part on the one or more signals.

In another aspect of the present disclosure, determining the plurality of participating wireless modules further may include determining a predicted location of the one or more occupants within a passenger compartment of the vehicle. Determining the plurality of participating wireless modules further may include determining the plurality of participating wireless modules based at least in part on the predicted location of the one or more occupants within the passenger compartment of the vehicle.

In another aspect of the present disclosure, determining the predicted location of the one or more occupants within a passenger compartment of the vehicle further may include performing one or more measurements using one or more vehicle sensors. The one or more vehicle sensors includes at least one of: a vehicle camera, a vehicle microphone, and a vehicle seat occupancy sensor. Determining the predicted location of the one or more occupants within a passenger compartment of the vehicle further may include determining the predicted location of the one or more occupants within the passenger compartment of the vehicle based at least in part on the one or more measurements.

In another aspect of the present disclosure, transmitting the one or more signals between at least two of the plurality of participating wireless modules further may include transmitting the one or more signals between each combination of two of the plurality of participating wireless modules.

In another aspect of the present disclosure, transmitting the one or more signals between at least two of the plurality of participating wireless modules further may include varying a frequency band of the one or more signals between at least two of the one or more sensing rounds.

In another aspect of the present disclosure, determining the presence of the one or more occupants in the vehicle further may include performing an inverse Fourier transform on the plurality of CSI values to determine a time-domain power delay profile. Determining the presence of the one or more occupants in the vehicle further may include identifying a motion marker based at least in part on the time-domain power delay profile. Determining the presence of the one or more occupants in the vehicle further may include determining a presence of the one or more occupants in the vehicle based at least in part on the motion marker.

According to several aspects, a system for detecting one or more occupants in a vehicle is provided. The system may include a plurality of wireless modules and one or more vehicle sensors. The one or more vehicle sensors includes at least one of: a vehicle camera, a vehicle microphone, and a vehicle seat occupancy sensor. The system further may include a controller in electrical communication with the plurality of wireless modules and the one or more vehicle sensors. The controller is programmed to perform one or more measurements using the one or more vehicle sensors. The controller is further programmed to determine a predicted location of the one or more occupants within a passenger compartment of the vehicle based at least in part on the one or more measurements. The controller is further programmed to determine a plurality of participating wireless modules based at least in part on the predicted location of the one or more occupants within a passenger compartment of the vehicle. The plurality of participating wireless modules is a subset of the plurality of wireless modules. The plurality of participating wireless modules includes at least two of the plurality of wireless modules. The controller is further programmed to transmit one or more signals between at least two of the plurality of participating wireless modules. The controller is further programmed to determine a plurality of channel state information (CSI) values based at least in part on the one or more signals. The controller is further programmed to determine a presence of the one or more occupants in the vehicle based at least in part on the plurality of CSI values.

In another aspect of the present disclosure, to determine the presence of the one or more occupants in the vehicle, the controller is further programmed to perform an inverse Fourier transform on the plurality of CSI values to determine a time-domain power delay profile. The time-domain power delay profile includes one or more reflections of the one or more signals. To determine the presence of the one or more occupants in the vehicle, the controller is further programmed to identify a motion marker based at least in part on the one or more reflections in the time-domain power delay profile. To determine the presence of the one or more occupants in the vehicle, the controller is further programmed to determine a presence of the one or more occupants in the vehicle based at least in part on the motion marker.

In another aspect of the present disclosure, one or more of the plurality of wireless modules are located within a passenger compartment of the vehicle. A location of each of the plurality of wireless modules is determined based at least in part on an estimated sensing signal-to-noise ratio (SSNR) at one or more target locations within the passenger compartment of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, it is advantageous to detect the presence and/or location of occupants within a passenger compartment of a vehicle. To this end, vehicles may be equipped with various sensors for the purpose of occupant detection, for example, for the purpose of child left behind detection. However, occupant sensors may not always detect occupant presence. For example, an occupant may be obscured by a blanket or other object, hindering detection by a visual sensor (e.g., a camera). Furthermore, occupants may be lightweight (e.g., a child or infant), hindering detection by a weight or pressure-based sensor. Accordingly, the present disclosure provides a new and improved system and method for detecting one or more occupants in a vehicle based on detection of motion in the vehicle using wireless communication techniques.

Figure 1:
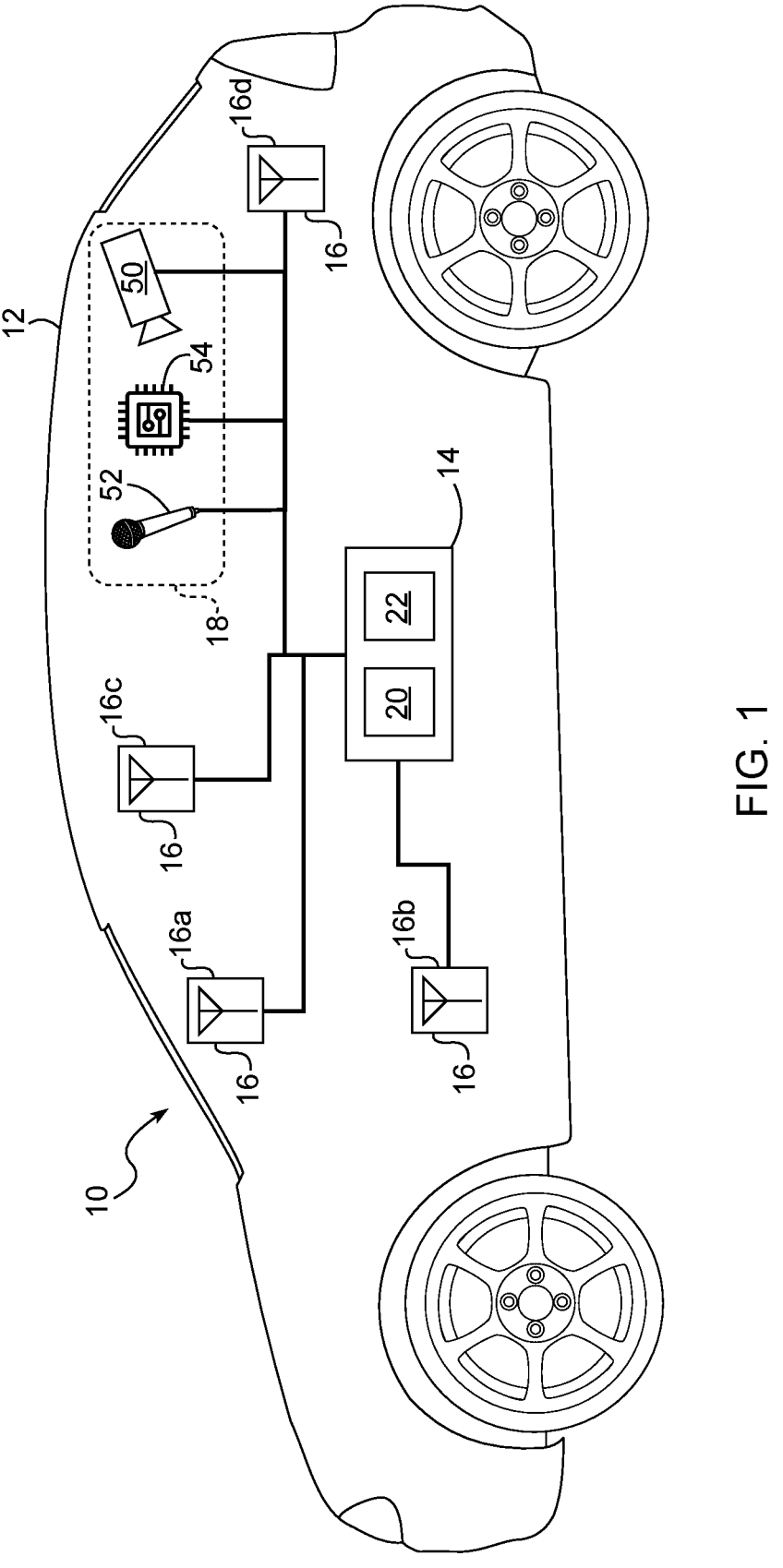
FIG. 1 is a schematic diagram of a system for detecting one or more occupants in a vehicle, according to an exemplary embodiment.

Referring to FIG. 1, a system for detecting one or more occupants in a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of wireless modules 16, and one or more vehicle sensors 18.

The controller 14 is used to implement a method 100 for detecting one or more occupants in a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or nonvolatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of wireless modules 16 and the one or more vehicle sensors 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of wireless modules 16 are used to wirelessly communicate with devices inside and/or outside of the vehicle 12. In an exemplary embodiment, one or more of the plurality of wireless modules 16 is a vehicle communication system. In the scope of the present disclosure, the vehicle communication system is used to communicate with other systems internal and/or external to the vehicle 12. For example, the vehicle communication system includes capabilities for communication with vehicles ("V2V" communication), infrastructure ("V2I" communication), remote systems at a remote call center (e.g., ON-STAR by GENERAL MOTORS) and/or personal devices.

In general, the term vehicle-to-everything communication ("V2X" communication) refers to communication between the vehicle 12 and any remote system (e.g., vehicles, infrastructure, and/or remote systems). In certain embodiments, the vehicle communication system is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system may further include an embedded universal integrated circuit card (eUICC) configured to store at least one cellular connectivity configuration profile, for example, an embedded subscriber identity module (eSIM) profile.

The vehicle communication system is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system may include one or more antennas and/or communication transceivers for receiving and/or transmitting signals, such as cooperative sensing messages (CSMs). The vehicle communication system is configured to wirelessly communicate information between the vehicle 12 and another vehicle. Further, the vehicle communication system is configured to wirelessly communicate information between the vehicle 12 and infrastructure or other vehicles. Furthermore, the vehicle communication system is configured to wirelessly communicate information between one or more of the plurality of wireless modules 16.

Figure 2:
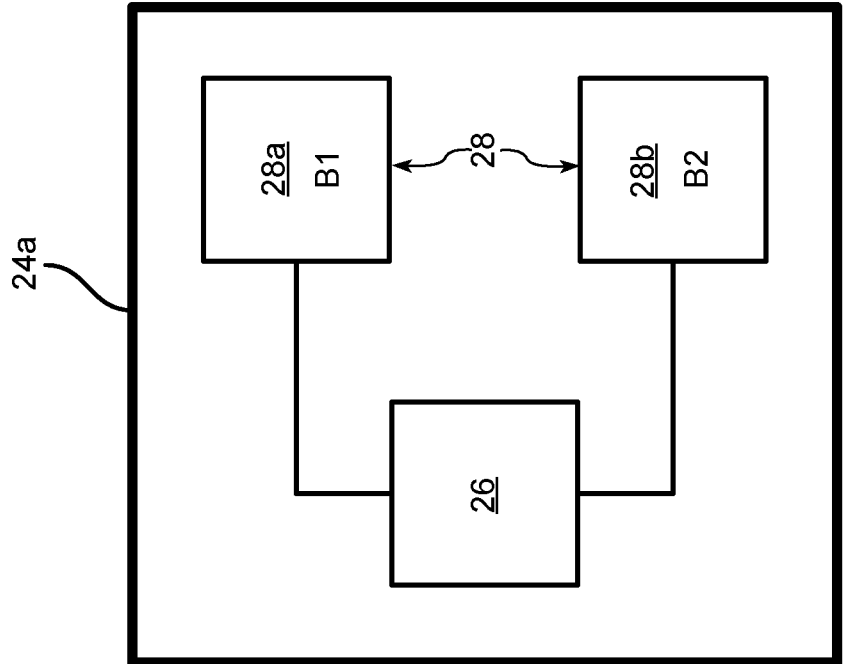
FIG. 2 is a schematic diagram of a digital WLAN transceiver system, according to an exemplary embodiment.

In another exemplary embodiment, one or more of the plurality of wireless modules 16 is a digital wireless local area network (WLAN) transceiver system. Referring to FIG. 2, a schematic diagram of a digital WLAN transceiver system 24a is shown. In an exemplary embodiment, the digital WLAN transceiver system 24a includes a wireless control module 26 capable of implementing a wireless communication protocol which employs training signals for performing channel state information (CSI) estimation. In the scope of the present disclosure, training signals are known signals which are transmitted for purposes of CSI estimation. In the scope of the present disclosure, CSI values describe how wireless signals propagate in an environment. More specifically, the CSI values represent the combined effects of, for example, scattering, fading, and power decay. In other words, CSI is an estimate of frequency response for a transmission channel between two or more transceivers. In a non-limiting example, the digital WLAN transceiver system 24a supports a wireless communication protocol according to one or more of the Institute of Electrical and Electronics Engineers (IEEE) 802.11 wireless local area network (WLAN) related standards. In an exemplary embodiment, the digital WLAN transceiver system 24a includes at least one wireless transceiver module 28 in electrical communication with the wireless control module 26. The at least one wireless transceiver module 28 is configured to transmit and receive signals on a first frequency band B1 (e.g., a 2.4 GHz frequency band). In another exemplary embodiment, the digital WLAN transceiver system 24a includes at least two wireless transceiver modules 28, as shown in FIG. 2. A first wireless transceiver module 28a is configured to transmit and receive signals on the first frequency band B1. A second wireless transceiver module 28b is configured to transmit and receive signals on a second frequency band B2 (e.g., a 5 GHz frequency band).

In an exemplary embodiment, the first frequency band B1 and/or the second frequency band B2 are divided into a plurality of subfrequencies (i.e., subcarriers). Data to be transmitted is divided into a plurality of data streams. Each of the plurality of data streams is modulated with one of the plurality of subcarriers for transmission. In an exemplary embodiment, training signals for performing channel state information (CSI) estimation are transmitted on one or more subcarriers per frequency band. In a non-limiting example, three subcarriers within the first frequency band B1 and/or the second frequency band B2 are used to transmit and/or receive training signals. In another non-limiting example, all subcarriers within the first frequency band B1 and/or the second frequency band B2 are used to transmit and/or receive training signals.

Figure 3:
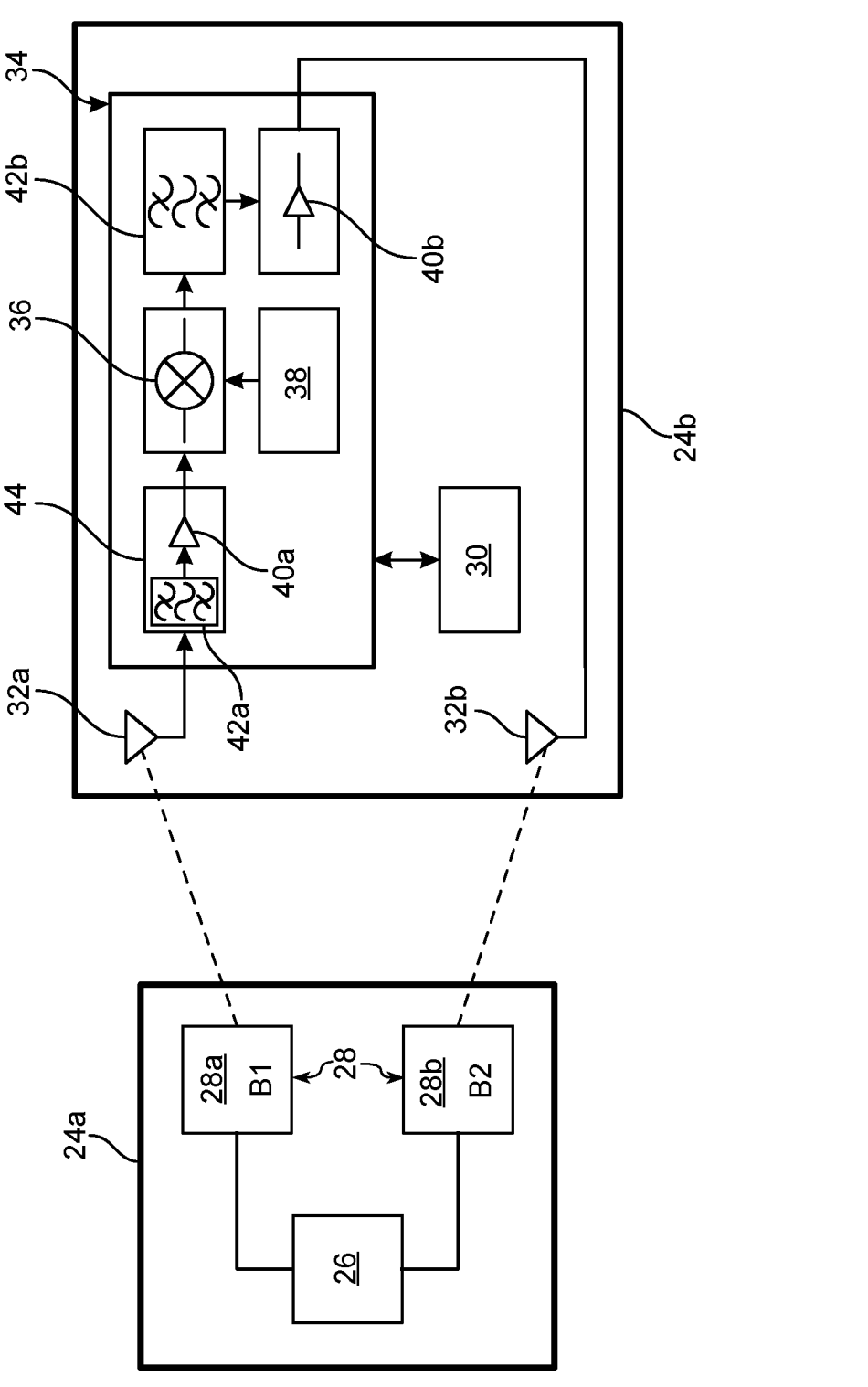
FIG. 3 is a schematic diagram of a signal conversion device with the digital WLAN transceiver system of FIG. 2, according to an exemplary embodiment.

Referring again to FIG. 1, in another exemplary embodiment, one or more of the plurality of wireless modules 16 is a signal conversion device. Referring to FIG. 3, a schematic diagram of a signal conversion device 24b with the digital WLAN transceiver system 24a is shown. The signal conversion device 24b includes a power source 30, at least two antennas (i.e., a first antenna 32a and a second antenna 32b), and a conversion circuit 34.

The power source 30 is used to provide power to the conversion circuit 34. In an exemplary embodiment, the power source 30 is a connection to a power system of the vehicle 12, for example, a twelve-volt electrical system of the vehicle 12. In another exemplary embodiment, the power source 30 is a battery. In another exemplary embodiment, the power source 30 is an energy harvesting device configured to harvest energy from, for example radio frequency signals, light, vibrations, heat, and/or the like, and transform the harvested energy into electrical energy. The power source 30 is in electrical communication with the conversion circuit 34. It should be understood that the power source 30 may be any device capable of providing electrical power to the conversion circuit 34 without departing from the scope of the present disclosure.

The at least two antennas (i.e., the first antenna 32a and the second antenna 32b) are used to transmit and/or receive wireless communication signals. The first antenna 32a is used to receive wireless communication signals on the first frequency band B1, for example, wireless communication signals transmitted by the first wireless transceiver module 28a, as shown in FIG. 3. The second antenna 32b is used to transmit wireless communication signals on the second frequency band B2, for example, wireless communication signals which may be received by the second wireless transceiver module 28b, as shown in FIG. 3. The first antenna 32a and the second antenna 32b are in electrical communication with the conversion circuit 34, as will be discussed in greater detail below.

The conversion circuit 34 is used to convert wireless communication signals between the first frequency band B1 and the second frequency band B2. In an exemplary embodiment, the conversion circuit 34 includes a frequency mixer 36, an oscillator 38, a first amplifier 40a, a second amplifier 40b, a first bandpass filter 42a, and a second bandpass filter 42b. In an exemplary embodiment, the first amplifier 40a and the first bandpass filter 42a are packaged as a monolithic integrated circuit referred to as a combined amplifier with bandpass filter (LNA+BPF) 44.

The frequency mixer 36 is used to convert signals received using the first antenna 32a between the first frequency band B1 and the second frequency band B2, also known as heterodyning. In an exemplary embodiment, the frequency mixer 36 is a passive frequency mixer including passive components, such as, for example, diodes. In another exemplary embodiment, the frequency mixer 36 is an active frequency mixer including active components, such as, for example, transistors. In a non-limiting example, the frequency mixer 36 produces a signal at a mixer output of the frequency mixer 36 which is a product of two input signals supplied to a first mixer input and a second mixer input. The first mixer input of the frequency mixer 36 is in electrical communication with the oscillator 38. The second mixer input of the frequency mixer 36 is in electrical communication with the first amplifier 40a. The mixer output of the frequency mixer 36 is in electrical communication with the second bandpass filter 42b.

The oscillator 38 is used to produce an oscillating signal with a known frequency for the frequency mixer 36. In an exemplary embodiment, the oscillator 38 is referred to as a local oscillator. In a non-limiting example, the oscillator 38 is a crystal oscillator utilizing a piezoelectric element to produce the oscillating signal. In another non-limiting example, the oscillator 38 is a variable-frequency oscillator capable of producing oscillating signals having a variable frequency. The oscillator 38 is in electrical communication with the first mixer input of the frequency mixer 36. In an exemplary embodiment, the oscillator 38 receives electrical power from the power source 30.

The first amplifier 40*a* is used to amplify signals received by the first antenna 32*a*. In an exemplary embodiment, the first amplifier 40*a* is a low-noise amplifier (LNA). LNAs are designed to amplify a very low-power signal, such as an electrical current generated by an antenna, without significantly degrading the signal-to-noise ratio of the signal. In a non-limiting example, the first amplifier 40*a* also includes filters or other electronic circuits designed to remove undesired signal and/or noise from the electrical currents generated by the first antenna 32*a*. In a non-limiting example, the power source 30 supplies power and a DC bias signal to the first amplifier 40*a*. It should be understood that various additional types and/or topologies of amplifier may be used to amplify the electrical currents generated by the first antenna 32*a*. The first amplifier 40*a* is in electrical communication with the first bandpass filter 42*a* and the second mixer input of the frequency mixer 36.

The second amplifier 40*b* is used to amplify signals produced by the frequency mixer 36 for transmission by the second antenna 32*b*. In a non-limiting example, the power source 30 supplies power and a DC bias signal to the second amplifier 40*b*. It should be understood that various additional types and/or topologies of amplifier may be used to amplify the electrical signals generated by the frequency mixer 36 for transmission by the second antenna 32*b*. The second amplifier 40*b* is in electrical communication with the second bandpass filter 42*b* and the second antenna 32*b*.

The first bandpass filter 42*a* is used to filter signals received by the first antenna 32*a*. In an exemplary embodiment, the first bandpass filter 42*a* is a passive device utilizing resistors, inductors, and/or capacitors to achieve bandpass filtering. In another exemplary embodiment, the first bandpass filter 42*a* is an active device utilizing active components such as, for example, operational amplifiers, to achieve bandpass filtering. The center frequency of the first bandpass filter 42*a* is within the first frequency band B1, for example, at a center of the first frequency band B1. The first bandpass filter 42*a* is in electrical communication with the first antenna 32*a* and the first amplifier 40*a*.

The second bandpass filter 42*b* is used to attenuate extraneous frequency components introduced by the frequency mixer 36. In an exemplary embodiment, the second bandpass filter 42*b* is a passive device utilizing resistors, inductors, and/or capacitors to achieve bandpass filtering. In another exemplary embodiment, the second bandpass filter 42*b* is an active device utilizing active components such as, for example, operational amplifiers, to achieve bandpass filtering. The center frequency of the second bandpass filter 42*b* is within the second frequency band B2, for example, at a center of the second frequency band B2. The second bandpass filter 42*b* is in electrical communication with the mixer output of the frequency mixer 36 and the second amplifier 40*b*.

Figure 4:
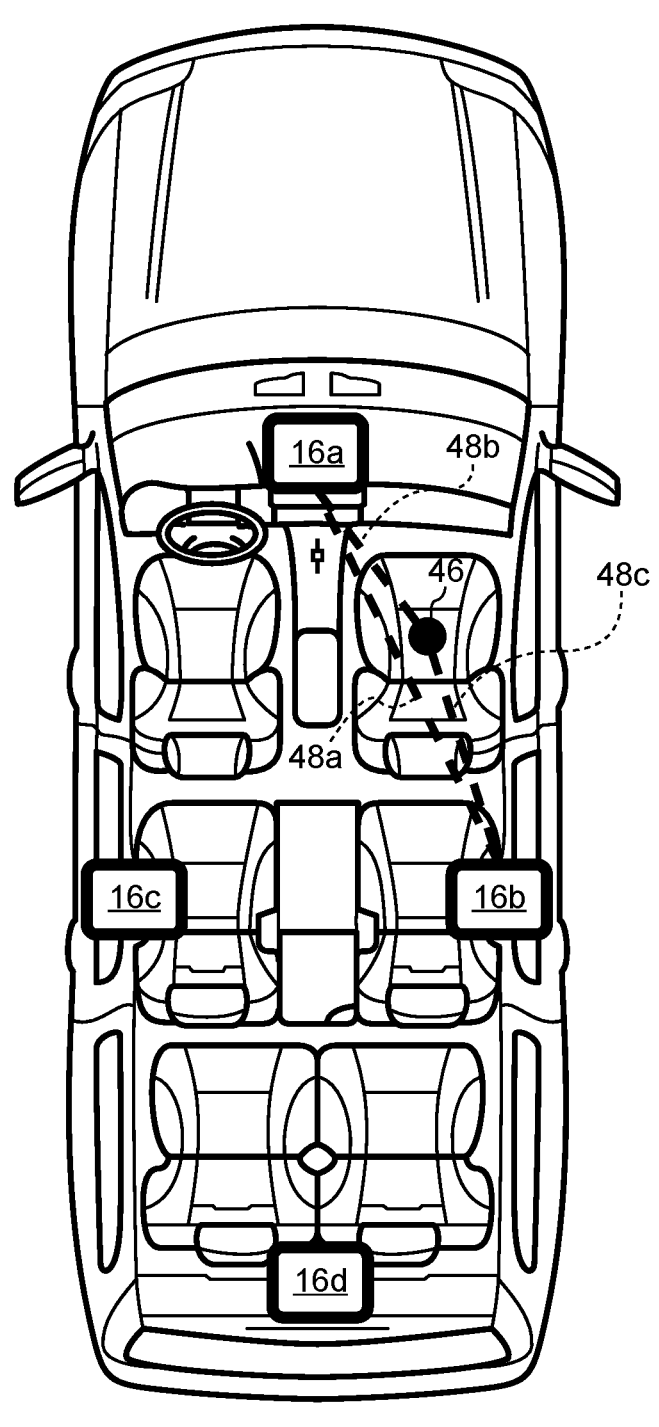
FIG. 4 is a schematic diagram of a passenger compartment of the vehicle showing a plurality of wireless modules, according to an exemplary embodiment.

Referring to FIG. 4, a schematic diagram of a passenger compartment of the vehicle showing the plurality of wireless modules 16 is shown. The plurality of wireless modules 16 are located within the passenger compartment of the vehicle 12. In an exemplary embodiment, a first wireless module 16*a* of the plurality of wireless modules 16 is located near a front of the vehicle 12, for example, near or adjacent to a front dashboard, instrument cluster and/or the like. A second wireless module 16*b* of the plurality of wireless modules 16 is located near a passenger's side of the vehicle 12, for example, near or adjacent to a passenger's side rear passenger seat of the vehicle 12. A third wireless module 16*c* of the plurality of wireless modules 16 is located near a driver's side of the vehicle 12, for example, near or adjacent to a driver's side rear passenger seat of the vehicle 12. A fourth wireless module 16*d* of the plurality of wireless modules 16 is located near a rear of the vehicle 12, for example, near or adjacent to a cargo compartment, trunk, third passenger seat row, and/or the like.

In an exemplary embodiment, the location of each of the plurality of wireless modules 16 within the passenger compartment of the vehicle 12 is determined based at least in part on an estimated sensing signal-to-noise ratio (SSNR) at one or more target locations 46 within the passenger compartment of the vehicle 12. In the scope of the present disclosure, SSNR is a ratio of a power of a dynamic signal reflected from the target location 46 to a total power of signals received. In the scope of the present disclosure, the target location 46 is a location within the passenger compartment of the vehicle 12 where the system 10 is attempting to detect occupancy. In a non-limiting example, the one or more target locations 46 may include one or more seats of the vehicle 12, as depicted in FIG. 4. While one exemplary target location 46 is shown in FIG. 4, it should be understood that the location of each of the plurality of wireless modules 16 within the passenger compartment of the vehicle 12 may be optimized based on multiple target locations, for example, based on a target location located at each seat of the vehicle 12.

In an exemplary embodiment, the estimated SSNR at a given target location 46 is:

$$SSNR_T \propto \frac{\gamma_{12}}{(\gamma_{1T}\gamma_{2T})^2} \tag{1}$$

where $SSNR_T$ is the SSNR at the target location 46 within the passenger compartment of the vehicle 12, $\gamma_{12}$ is a distance (e.g., a first distance 48*a*) between a first of the plurality of wireless modules 16 (e.g., the first wireless module 16*a*) and a second of the plurality of wireless modules 16 (e.g., the second wireless module 16*b*), $\gamma_{1T}$ is a distance (e.g., a second distance 48*b*) between the first of the plurality of wireless modules 16 (e.g., the first wireless module 16*a*) and the target location 46, and $\gamma_{2T}$ is a distance (e.g., a third distance 48*c*) between the second of the plurality of wireless modules 16 (e.g., the second wireless module 16*b*) and the target location 46. It should be understood that Equation 1 may be used to estimate the SSNR at any location in or around the vehicle 12 for any pair of the plurality of wireless modules 16.

In an exemplary embodiment, during design and/or manufacturing of the vehicle 12 and the system 10, the location of each of the plurality of wireless modules 16 within the passenger compartment of the vehicle 12 is chosen by optimizing Equation 1 to maximize estimated SSNR values at particular target locations 46 of interest for occupancy detection within the passenger compartment of the vehicle 12 (e.g., seats of the vehicle 12, as depicted in FIG. 4). In an exemplary embodiment, placement of the plurality of wireless modules 16 based on Equation 1 results in increased sensitivity and accuracy of the system 10.

In an exemplary embodiment, the plurality of wireless modules 16 are mounted to a headliner, a floor, a frame, a support pillar, a seat structure, and/or any additional mounting surface within the vehicle 12. In a non-limiting example, the plurality of wireless modules 16 are concealed by interior styling components of the vehicle 12, such as, for example, interior trim pieces. It should be understood that the aforementioned description of quantity and mounting of the plurality of wireless modules 16 is merely exemplary in nature. Variations in quantity and/or mounting method or location of the plurality of wireless modules 16 do not constitute a departure from the scope of the present disclosure.

Referring again to FIG. 1, the one or more vehicle sensors 18 are used to acquire information about an environment within the vehicle 12 (i.e., within a cabin and/or passenger compartment of the vehicle 12). In an exemplary embodiment, the one or more vehicle sensors 18 includes at least one of: a vehicle camera 50, a vehicle microphone 52, and a vehicle seat occupancy sensor 54.

The vehicle camera 50 is used to capture images and/or videos of the environment within the vehicle 12. In an exemplary embodiment, the vehicle camera 50 is a photo and/or video camera which is positioned to view the environment within the vehicle 12. In one example, the vehicle camera 50 is affixed inside of the vehicle 12, for example, in a headliner of the vehicle 12, having a view of the interior of the vehicle 12. It should be understood that the vehicle camera 50 may include multiple cameras disposed in multiple locations throughout the vehicle 12 without departing from the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle microphone 52 is used to convert acoustic waves into electrical signals. In an exemplary embodiment, the vehicle microphone 52 includes a unidirectional dynamic microphone (i.e., a microphone which converts acoustic waves to electrical signals using electromagnetic induction) configured to receive sound from one or more specific regions of the interior of the vehicle 12. In another exemplary embodiment, the vehicle microphone 52 includes a plurality of microelectromechanical systems (MEMS) microphones (e.g., a microphone having a pressure-sensitive diaphragm etched directly into a silicon wafer) disposed throughout the interior of the vehicle 12. In another exemplary embodiment, the vehicle microphone 52 includes directional and/or beamforming microphones capable of providing data used for localization of sound sources. It should be understood that additional types of microphones which are configured to convert acoustic waves to electrical signals (e.g., digital and/or analog electrical signals) are included in the scope of the present disclosure. The vehicle microphone 52 is in electrical communication with the controller 14, as discussed above.

The vehicle seat occupancy sensor 54 is used to detect a presence of an occupant in a seat of the vehicle 12. In an exemplary embodiment, the vehicle seat occupancy sensor 54 includes a pressure and/or weight sensor integrated into the seat of the vehicle 12. In a non-limiting example, when an occupant is sitting on the seat of the vehicle 12, the controller 14 uses the pressure and/or weight sensor to detect a pressure and/or weight distribution on the seat of the vehicle 12, signaling the presence of the occupant. The vehicle seat occupancy sensor 54 is in electrical communication with the controller 14, as discussed above.

Figure 5:
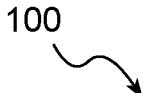
FIG. 5 is a flowchart of a method for detecting one or more occupants in a vehicle, according to an exemplary embodiment.
Figure 5:
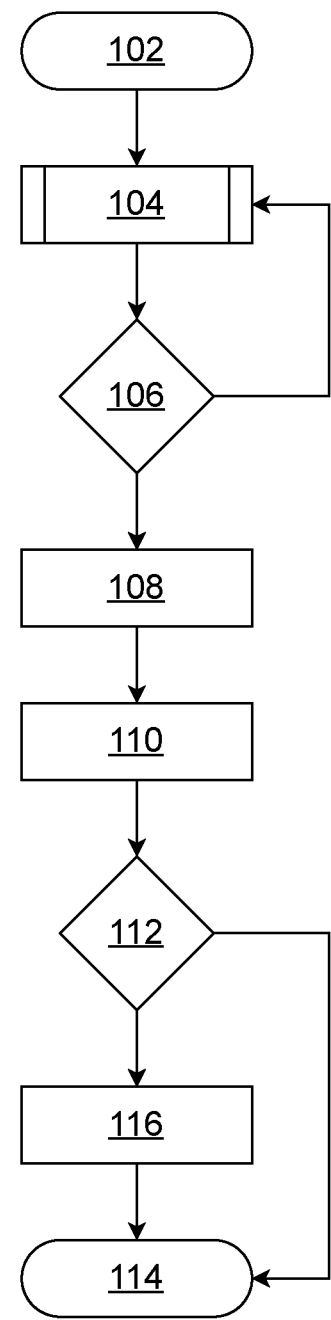

Referring to FIG. 5, a flowchart of the method 100 for detecting one or more occupants in a vehicle is shown. The method 100 begins at block 102 and proceeds to block 104. At block 104, the controller 14 performs a sensing round using at least two of the plurality of wireless modules 16, as will be discussed in greater detail below. The result of the sensing round is a plurality of CSI values. After block 104, the method 100 proceeds to block 106.

At block 106, the controller 14 determines whether a predetermined quantity of sensing rounds (e.g., ten sensing rounds) has been completed. In an exemplary embodiment, the predetermined quantity of sensing rounds is determined by a software application running on the controller 14 which requests sensing. For example, a child left behind detection software may request ten sensing rounds. At block 106, if the predetermined quantity of sensing rounds has not been completed, the method 100 returns to block 104 to perform another sensing round. If the predetermined quantity of sensing rounds has been completed, the method 100 proceeds to block 108. Therefore, upon proceeding to block 108, multiple pluralities of CSI values have been recorded by the controller 14, one plurality of CSI values produced by each sensing round.

Figures 6, 7:
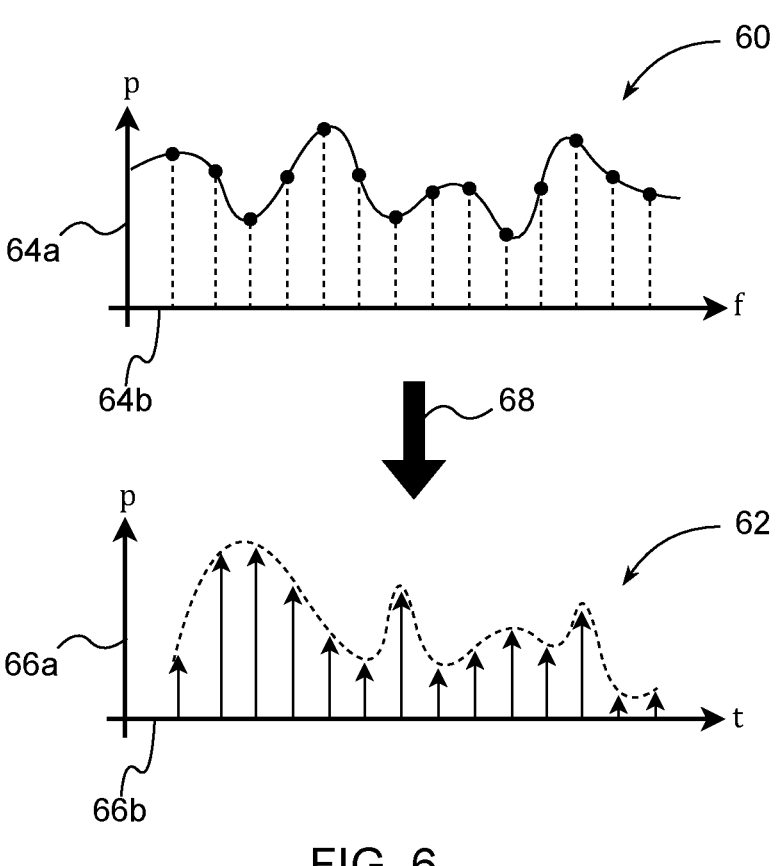
FIG. 6 is a diagram showing a frequency-domain graph of one plurality of channel state information (CSI) values from a single sensing round and a time-domain graph of a power delay profile from a single sensing round, according to an exemplary embodiment.
FIG. 7 is a diagram showing an exemplary time series power delay profile, according to an exemplary embodiment.

Referring to FIG. 6, a diagram showing a frequency-domain graph 60 of one plurality of CSI values from a single sensing round and a time-domain graph 62 of a power delay profile from a single sensing round is provided. The frequency-domain graph 60 includes a y-axis 64a and an x-axis 64b. The y-axis 64a represents a signal power level and the x-axis 64b represents a signal frequency. The time-domain graph 62 includes a y-axis 66a and an x-axis 66b. The y-axis 66a represents a signal power level and the x-axis 66b represents a signal delay time. The arrow 68 represents a mathematical process allowing conversion of the frequency-domain graph 60 to the time-domain graph 62, for example, an inverse Fourier transform.

With reference to FIG. 6 and continued reference to FIG. 5, at block 108, the controller 14 processes the plurality of CSI values produced by each sensing round. In an exemplary embodiment, the controller 14 performs an inverse Fourier transform on the plurality of CSI values produced by each sensing round, as illustrated in FIG. 6. The result of each inverse Fourier transform is the time-domain graph 62, which is referred to as a time-domain power delay profile. Each time-domain graph 62 contains a snapshot of a plurality of reflected signals in time from one sensing round. Therefore, by performing the inverse Fourier transform on the plurality of CSI values produced by each sensing round, the power variation in each of the plurality of reflected signals over time may be determined.

Referring to FIG. 7, a diagram showing an exemplary time series power delay profile 70 is provided. The time series power delay profile 70 shows the power variation in each of the plurality of reflected signals over time. The time series power delay profile 70 includes a y-axis 72a, an x-axis 72b, and a tau-axis 72c (t). The y-axis 72a represents a signal power level, the x-axis 72b represents time, and the tau-axis 72c represents the plurality of reflected signals. For example, 11 is a signal power level of a first of the plurality of reflected signals over time, as determined from multiple time-domain power delay profiles corresponding to multiple sensing rounds. Referring again to FIG. 5, after block 108, the method 100 proceeds to block 110.

At block 110, the controller 14 identifies a motion marker. In the scope of the present disclosure, the motion marker is a pattern in the plurality of CSI values corresponding to motion of an occupant in the passenger compartment of the vehicle 12. In an exemplary embodiment, the motion marker includes a low-fidelity motion maker. The low-fidelity motion marker is indicative of a general movement or a presence of the occupant in the passenger compartment of the vehicle 12. The low-fidelity motion marker is determined by differentiating the plurality of CSI values over time, taking the magnitude and norm of the differentiated CSI values, and averaging the norm values over time. If the norm value exceeds a predetermined threshold, the low-fidelity motion marker is identified. Determination of the low-fidelity motion marker is discussed in greater detail in U.S. application Ser. No. 18/469,086, titled "SYSTEM AND METHOD FOR ACTIVATING A VOICE ASSISTANT FOR A VEHICLE", filed on Sep. 18, 2023, the entire contents of which is hereby incorporated by reference.

In another exemplary embodiment, the motion marker is identified based on analysis of the time series power delay profile 70 (FIG. 7). In a non-limiting example, signal processing techniques, such as, for example, computation of spectrograms, principal component analysis, Fourier transform, and/or the like are used to identify reflected signals of interest based on signal characteristics. Referring again to FIG. 7, in a non-limiting example, the signal $\tau_3$ exhibits a regular, periodic pattern indicating, for example, a rise and fall of a chest of a breathing occupant in the passenger compartment of the vehicle 12. Periodic patterns such as breathing may be detected using a Fourier transform and/or a spectrogram analysis. It should be understood that the signal 13 depicted in the time series power delay profile 70 of FIG. 7 is merely exemplary in nature, and that the use of various additional signal processing techniques for identification of any motion indicative of vehicle occupancy are within the scope of the present disclosure. Referring again to FIG. 5, after block 110, the method 100 proceeds to block 112.

At block 112, the controller 14 determines a presence of one or more occupants in the vehicle 12 based at least in part on the motion marker identified at block 110. In an exemplary embodiment, if the low-fidelity motion marker is identified, one or more occupants are determined to be present in the vehicle 12. In another exemplary embodiment, if analysis of the time series power delay profile 70 identifies any motion indicative of vehicle occupancy (e.g., breathing motion of an occupant), one or more occupants are determined to be present in the vehicle 12. If one or more occupants are not determined to be present in the vehicle 12, the method 100 proceeds to enter a standby state at block 114. If one or more occupants are determined to be present in the vehicle 12, the method 100 proceeds to block 116.

At block 116, the controller 14 takes action in response to determining that one or more occupants are present in the vehicle 12. In an exemplary embodiment, the action is determined based at least in part on a software application running on the controller 14 which requests activation of the system 10. In a non-limiting example, a child left behind detection software may take action by providing a visual, audible, and/or haptic notification and/or warning to a driver and/or occupant of the vehicle 12, informing them that an additional occupant (e.g., a child) is present in the vehicle 12. After block 116, the method 100 proceeds to enter the standby state at block 114.

In an exemplary embodiment, the controller 14 repeatedly exits the standby state 114 and restarts the method 100 at block 102. In a non-limiting example, the controller 14 exits the standby state 114 and restarts the method 100 on a timer, for example, every three hundred milliseconds.

Figure 8:
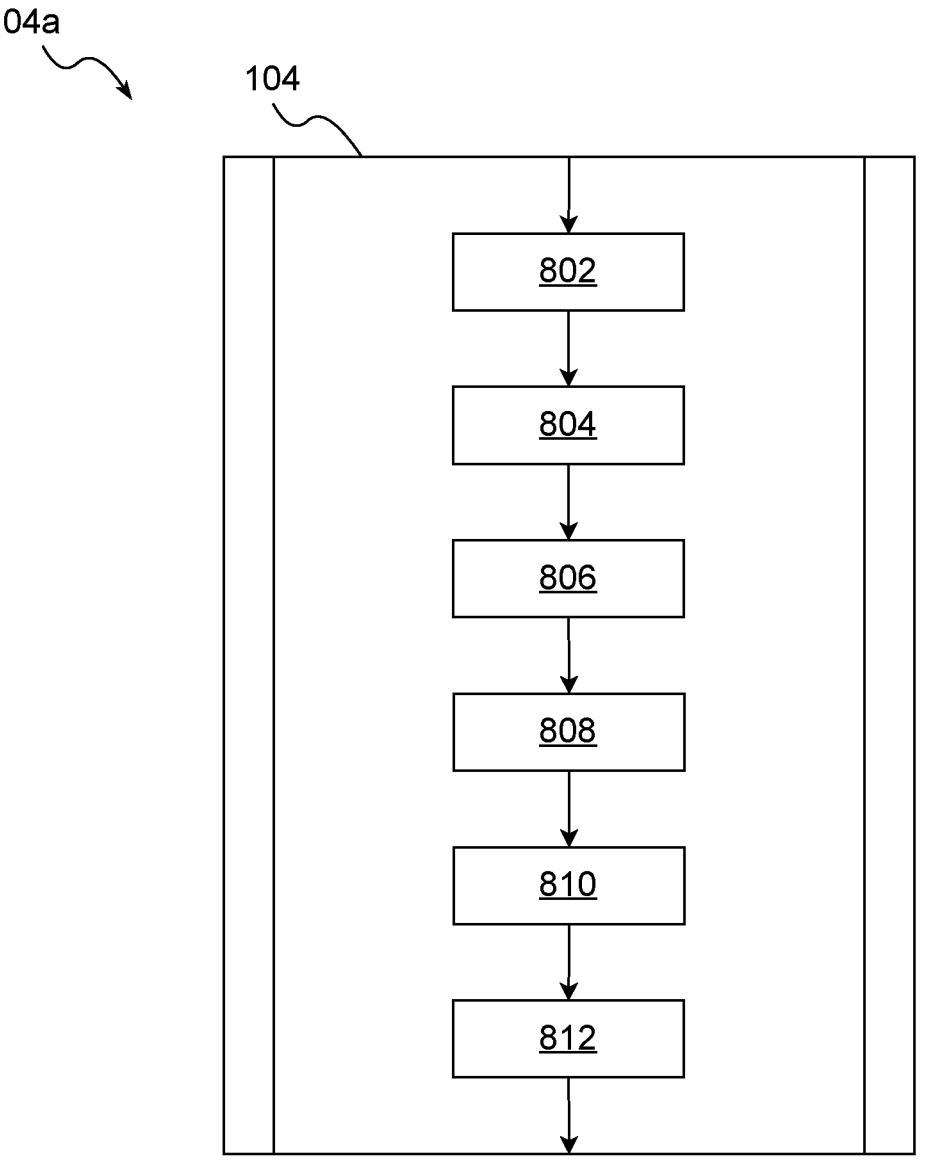
FIG. 8 is a flowchart of a method for performing a sensing round, according to an exemplary embodiment.

Referring to FIG. 8, a flowchart of an exemplary embodiment 104a of block 104 (i.e., a method for performing a sensing round) is shown. The exemplary embodiment 104a begins at block 802. At block 802, the controller 14 performs one or more measurements using the one or more vehicle sensors 18. In an exemplary embodiment, the one or more measurements includes one or more images and/or videos of the passenger compartment of the vehicle 12 captured by the vehicle camera 50. In another exemplary embodiment, the one or more measurements includes one or more sound measurements captured by the vehicle microphone 52. In another exemplary embodiment, the one or more measurements includes one or more weight and/or pressure measurements performed by the vehicle seat occupancy sensor 54. After block 802, the exemplary embodiment 104a proceeds to block 804.

At block 804, the controller 14 determines a predicted location of one or more occupants within the passenger compartment of the vehicle 12 based at least in part on the one or more measurements performed at block 802. In an exemplary embodiment, the controller 14 uses a computer vision algorithm to segment and classify the one or more images and/or videos of the passenger compartment to identify the predicted location of occupants. In another exemplary embodiment, the controller 14 analyzes the one or more sound measurements to determine the predicted location of occupants based on data from directional and/or beamforming microphones. In another exemplary embodiment, the controller 14 determines the predicted location based on one or more weight and/or pressure measurements of one or more seats in the vehicle 12. After block 804, the exemplary embodiment 104a proceeds to block 806.

At block 806, the controller 14 determines a plurality of participating wireless modules based at least in part on the predicted location determined at block 804. In an exemplary embodiment, the plurality of participating wireless modules is a subset of the plurality of wireless modules 16. The plurality of participating wireless modules includes at least two of the plurality of wireless modules 16. In an exemplary embodiment, the plurality of participating wireless modules is determined based on the estimated SSNR at the predicted location based as determined based on Equation 1. In a non-limiting example, the plurality of participating wireless modules includes any pair of the plurality of wireless modules 16 for which Equation 1 predicts an SSNR at the predicted location greater than or equal to a predetermined SSNR threshold.

Referring again to FIG. 4, an exemplary selection of the plurality of participating wireless modules is discussed. It should be understood that the following process for exemplary selection of the participating wireless modules is merely exemplary in nature, and that assumptions made for the sake of example do not serve to limit the scope of the present disclosure. Assume, for the sake of example, that the predicted location is at the target location 46. Assume also, for the sake of example, that Equation 1 gives a normalized exemplary estimated SSNR of 1 at the target location 46 for communications between the first wireless module 16a and the second wireless module 16b. Assume also, for the sake of example, that Equation 1 gives a normalized exemplary estimated SSNR of 0.7 at the target location 46 for communications between the first wireless module 16a and the third wireless module 16c. Assume also, for the sake of example, that Equation 1 gives a normalized exemplary estimated SSNR of 0.4 at the target location 46 for communications between the second wireless module 16*b* and the fourth wireless module 16*d*. Assume also, for the sake of example, that the predetermined SSNR threshold is 0.5. Therefore, in the aforementioned exemplary scenario, the plurality of participating wireless modules includes the first wireless module 16*a*, the second wireless module 16*b*, and the third wireless module 16*c*.

It should be understood that the aforementioned scenario is merely exemplary in nature. It should further be understood that the controller 14 may utilize any algorithm, logic, or method for determining the plurality of participating wireless modules based on the estimated SSNR at the predicted location. In a non-limiting example, the controller 14 stores information about which pairs of the plurality of wireless modules 16 provide high estimated SSNR at a plurality of predetermined target locations, using, for example, a lookup table.

In an exemplary embodiment, it is desirable to minimize the quantity of participating wireless modules to decrease a time required for each sensing round and increase an overall sensing frequency of the system 10. In some embodiments, the controller 14 may adopt a "round-robin" strategy, incorporating a different subset of the plurality of wireless modules 16 into the plurality of participating wireless modules during each sensing round. In some embodiments, the controller 14 incorporates all of the plurality of wireless modules 16 into the plurality of participating wireless modules during each sensing round.

Furthermore, the controller 14 may adjust the plurality of participating wireless modules based on hardware capabilities (e.g., available transmission and reception channels and frequency bands) of each of the plurality of wireless modules 16. For example, signal conversion devices 24*b* may only be capable of reception and re-transmission of received signals, and not generation of new signals. After block 806, the exemplary embodiment 104*a* proceeds to block 808.

At block 808, the controller 14 determines transmission characteristics for transmission of one or more signals between each of the plurality of participating wireless modules. In the scope of the present disclosure, the transmission characteristics include, for example, a transmission frequency band and a transmission channel. In an exemplary embodiment, the frequency band is determined based on the hardware capabilities of each of the plurality of wireless modules 16. In an exemplary embodiment, the controller 14 varies the frequency band and/or the transmission channel of the one or more signals between at least two of the one or more sensing rounds. For example, a first sensing round of the one or more sensing rounds may utilize a 2.4 GHz frequency band, while a second sensing round of the one or more sensing rounds utilizes a 5 GHz frequency band. In a non-limiting example, the frequency band and/or transmission channel is switched using a channel switch announcement (CSA) message. In an exemplary embodiment, it is advantageous to vary the frequency band and/or transmission channel, as each combination of frequency band and channel gives access to an additional bandwidth for sensing, increasing a sensing resolution of the system 10. After block 808, the exemplary embodiment 104*a* proceeds to block 810.

At block 810, the controller 14 transmits one or more signals between each combination of two (i.e., each possible pair) of the plurality of participating wireless modules. In an exemplary embodiment, the one or more signals are original training signals (i.e., known signals transmitted for the purpose of CSI value estimation).

In an exemplary embodiment, for each pair of the plurality of participating wireless modules, one of the pair transmits the original training signals and the other of the pair receives propagated training signals. In another exemplary embodiment where the digital WLAN transceiver system 24*a* and the signal conversion device 24*b* are utilized, the digital WLAN transceiver system 24*a* transmits the original training signals, the signal conversion device 24*b* receives the original training signals, converts them to another frequency band (e.g., the second frequency band B2), and retransmits them back to the digital WLAN transceiver system 24*a*. In an exemplary embodiment, for each pair of the plurality of participating wireless modules, the original training signals are transmitted between one pair at a time to mitigate interference and/or crosstalk between pairs of participating wireless modules. In another exemplary embodiment, the original training signals are transmitted between all pairs of the plurality of participating wireless modules simultaneously using different frequency bands (e.g., orthogonal frequency bands).

The received signals are referred to as propagated training signals because they may differ from the original training signals due to the combined effects of, for example, scattering, fading, and power decay caused by objects in the passenger compartment of the vehicle 12 (e.g., occupants). After block 810, the exemplary embodiment 104*a* proceeds to block 812.

At block 812, the controller 14 determines the plurality of CSI values based at least in part on the one or more signals transmitted at block 810. In an exemplary embodiment, the plurality of CSI values are determined based at least in part on a deviation between the original training signals and the propagated training signals. After block 812, the exemplary embodiment 104*a* is concluded, and the method 100 proceeds as discussed above.

The system 10 and method 100 of the present disclosure offer several advantages. By optimizing the placement of the plurality of wireless modules 16 based on Equation 1, the precision of the system 10 for detecting motion in locations of interest is increased. Furthermore, by adjusting the plurality of participating wireless modules based on the predicted location and the estimated SSNR provided by Equation 1, the system 10 may dynamically adjust sensing precision and frequency based on the predicted location of the occupant.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting one or more occupants in a vehicle, the system comprising:
a plurality of wireless modules, wherein one or more of the plurality of wireless modules is at least one of: a digital wireless local area network (WLAN) transceiver system configured to implement a wireless communication protocol and a signal conversion device configured to convert signals between at least two frequency bands, wherein one or more of the plurality of wireless modules are located within a passenger compartment of the vehicle, and wherein a location of each of the plurality of wireless modules is determined based at least in part on an estimated sensing signal-to-noise ratio (SSNR) at one or more target locations within the passenger compartment of the vehicle;

a controller in electrical communication with the plurality of wireless modules, wherein the controller is programmed to:

perform one or more sensing rounds, wherein each of the one or more sensing rounds includes communication between at least two of the plurality of wireless modules; and determine a presence of the one or more occupants in the vehicle based at least in part on the one or more sensing rounds.

2. The system of claim 1, wherein to perform the one or more sensing rounds, the controller is further programmed to:

determine a plurality of participating wireless modules, wherein the plurality of participating wireless modules is a subset of the plurality of wireless modules, and wherein the plurality of participating wireless modules includes at least two of the plurality of wireless modules;

transmit one or more signals between at least two of the plurality of participating wireless modules; and determine a plurality of channel state information (CSI) values based at least in part on the one or more signals.

3. The system of claim 2, wherein to determine the plurality of participating wireless modules, the controller is further programmed to:

determine a predicted location of the one or more occupants within the passenger compartment of the vehicle; and determine the plurality of participating wireless modules based at least in part on the predicted location of the one or more occupants within the passenger compartment of the vehicle.

4. The system of claim 3, further comprising one or more vehicle sensors in electrical communication with the controller, wherein to determine the predicted location of the one or more occupants within the passenger compartment of the vehicle, the controller is further programmed to:

perform one or more measurements using the one or more vehicle sensors; and determine the predicted location of the one or more occupants within the passenger compartment of the vehicle based at least in part on the one or more measurements.

5. The system of claim 2, wherein to transmit the one or more signals between the at least two of the plurality of participating wireless modules, the controller is further programmed to:

transmit the one or more signals between each combination of two of the plurality of participating wireless modules.

6. The system of claim 2, wherein to transmit the one or more signals between the at least two of the plurality of participating wireless modules, the controller is further programmed to:

vary a frequency band of the one or more signals between at least two of the one or more sensing rounds.

7. The system of claim 2, wherein to determine the presence of the one or more occupants in the vehicle, the controller is further programmed to:

perform an inverse Fourier transform on the plurality of CSI values to determine a time-domain power delay profile;

identify a motion marker based at least in part on the time-domain power delay profile; and determine a presence of the one or more occupants in the vehicle based at least in part on the motion marker.

8. The system of claim 1, wherein the SSNR at a target location within the passenger compartment of the vehicle is defined by:

$$SSNR_T \propto \frac{\gamma_{12}}{(\gamma_{1T}\gamma_{2T})^2}$$

wherein $SSNR_T$ is the SSNR at the target location within the passenger compartment of the vehicle, $\gamma_{12}$ is a distance between a first of the plurality of wireless modules and a second of the plurality of wireless modules, $\gamma_{1T}$ is a distance between the first of the plurality of wireless modules and the target location, and is a distance between the second of the plurality of wireless modules and the target location.

9. A method for detecting one or more occupants in a vehicle, the method comprising:

performing one or more sensing rounds, wherein each of the one or more sensing rounds includes communication between at least two of a plurality of wireless modules, wherein performing the one or more sensing rounds further comprises:

determining a plurality of participating wireless modules, wherein the plurality of participating wireless modules is a subset of the plurality of wireless modules, and wherein the plurality of participating wireless modules includes at least two of the plurality of wireless modules;

transmitting one or more signals between at least two of the plurality of participating wireless modules;

determining a plurality of channel state information (CSI) values based at least in part on the one or more signals; and determining a presence of the one or more occupants in the vehicle based at least in part on the one or more sensing rounds.

10. The method of claim 9, wherein determining the plurality of participating wireless modules further comprises:

determining a predicted location of the one or more occupants within a passenger compartment of the vehicle; and determining the plurality of participating wireless modules based at least in part on the predicted location of the one or more occupants within the passenger compartment of the vehicle.

11. The method of claim 10, wherein determining the predicted location of the one or more occupants within the passenger compartment of the vehicle further comprises:

performing one or more measurements using one or more vehicle sensors, wherein the one or more vehicle sensors includes at least one of: a vehicle camera, a vehicle microphone, and a vehicle seat occupancy sensor; and determining the predicted location of the one or more occupants within the passenger compartment of the vehicle based at least in part on the one or more measurements.

12. The method of claim 11, wherein transmitting the one or more signals between at least two of the plurality of participating wireless modules further comprises:

transmitting the one or more signals between each combination of two of the plurality of participating wireless modules.

13. The method of claim 11, wherein transmitting the one or more signals between at least two of the plurality of participating wireless modules further comprises:

varying a frequency band of the one or more signals between at least two of the one or more sensing rounds.

14. The method of claim 11, wherein determining the presence of the one or more occupants in the vehicle further comprises:

performing an inverse Fourier transform on the plurality of CSI values to determine a time-domain power delay profile;

identifying a motion marker based at least in part on the time-domain power delay profile; and determining the presence of the one or more occupants in the vehicle based at least in part on the motion marker.

15. A system for detecting one or more occupants in a vehicle, the system comprising:

a plurality of wireless modules;

one or more vehicle sensors, wherein the one or more vehicle sensors includes at least one of: a vehicle camera, a vehicle microphone, and a vehicle seat occupancy sensor; and a controller in electrical communication with the plurality of wireless modules and the one or more vehicle sensors, wherein the controller is programmed to:

perform one or more measurements using the one or more vehicle sensors;

determine a predicted location of the one or more occupants within a passenger compartment of the vehicle based at least in part on the one or more measurements;

determine a plurality of participating wireless modules based at least in part on the predicted location of the one or more occupants within the passenger compartment of the vehicle, wherein the plurality of participating wireless modules is a subset of the plurality of wireless modules, and wherein the plurality of participating wireless modules includes at least two of the plurality of wireless modules;

transmit one or more signals between at least two of the plurality of participating wireless modules;

determine a plurality of channel state information (CSI) values based at least in part on the one or more signals; and determine a presence of the one or more occupants in the vehicle based at least in part on the plurality of CSI values.

16. The system of claim 15, wherein to determine the presence of the one or more occupants in the vehicle, the controller is further programmed to:

perform an inverse Fourier transform on the plurality of CSI values to determine a time-domain power delay profile, wherein the time-domain power delay profile includes one or more reflections of the one or more signals;

identify a motion marker based at least in part on the one or more reflections in the time-domain power delay profile; and determine the presence of the one or more occupants in the vehicle based at least in part on the motion marker.

17. The system of claim 16, wherein one or more of the plurality of wireless modules are located within a passenger compartment of the vehicle, and wherein a location of each of the plurality of wireless modules is determined based at least in part on an estimated sensing signal-to-noise ratio (SSNR) at one or more target locations within the passenger compartment of the vehicle.

* * * * *